United States Patent
Yang et al.

(10) Patent No.: US 6,696,841 B2
(45) Date of Patent: Feb. 24, 2004

(54) ELECTRIC POWER SYSTEM RELAY AND ON-LINE METHOD OF TESTING SAME

(75) Inventors: Lifeng Yang, Pittsburgh, PA (US); Robert Tracy Elms, Monroeville, PA (US); Deborah Kaltwasser Mort, Baden, PA (US)

(73) Assignee: Eaton Corporation, Cleveland, OH (US)

(*) Notice: Subject to any disclaimer, the term of this patent is extended or adjusted under 35 U.S.C. 154(b) by 125 days.

(21) Appl. No.: 10/109,184

(22) Filed: Mar. 28, 2002

(65) Prior Publication Data

US 2003/0184939 A1 Oct. 2, 2003

(51) Int. Cl.[7] .......................... G01R 31/02; H02H 3/00
(52) U.S. Cl. ....................................... 324/418; 361/115
(58) Field of Search .............................. 361/42, 44, 46, 361/95, 96, 115; 324/418, 422, 423, 424, 521, 522, 523, 527, 617; 340/638, 644, 635; 702/57–59, 64, 65, 117, 122, 124, 126, 183, FOR 103, FOR 106, FOR 111, FOR 134

(56) References Cited

U.S. PATENT DOCUMENTS

| | | | |
|---|---|---|---|
| 4,689,570 A | * | 8/1987 | Ohgaki et al. .............. 324/418 |
| 5,742,513 A | | 4/1998 | Bouhenguel et al. ....... 700/286 |
| 5,786,699 A | | 7/1998 | Sukegawa et al. .......... 324/617 |
| 6,239,960 B1 | | 5/2001 | Martin ........................ 361/86 |

OTHER PUBLICATIONS

GE Power Management, "750/760 Feeder Management Relay", Instruction Manual, Copyright 2002, pp. 15–1 –15–10 No month available.

* cited by examiner

*Primary Examiner*—N. Le
*Assistant Examiner*—Vincent Q. Nguyen
(74) *Attorney, Agent, or Firm*—Martin J. Moran

(57) ABSTRACT

An electric power system relay includes a simulator that substitutes test values of current and voltage for sensed values for use by relay logic to perform specified relay functions, but without loss of the relay protection functions. The sensed values of current at least are monitored even while the test values are being used by the relay logic. If the monitored sensed values exceed a threshold value, a data switch operates to return to use of the sensed current and voltage values by the relay logic. In addition, the sensed values of current and voltage replace the test values, if a time interval longer than that required to perform the specified relay functions using the test values has expired.

8 Claims, 1 Drawing Sheet

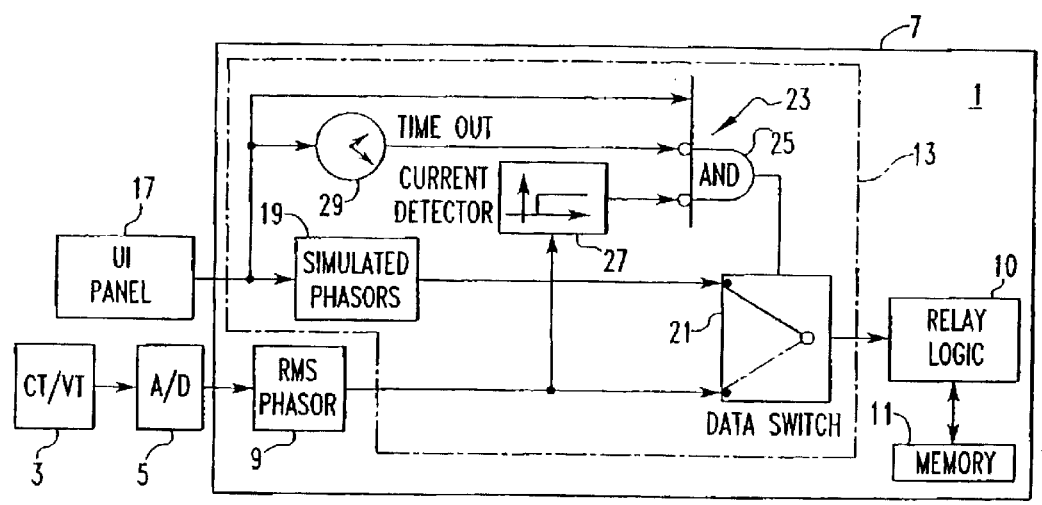

ELECTRIC POWER SYSTEM RELAY AND ON-LINE METHOD OF TESTING SAME

BACKGROUND OF THE INVENTION

1. Field of the Invention

This invention relates to providing protection, monitoring, and management of electric power systems, and more particularly, to the testing of relays which provide such functions without interruption of the protective functions.

2. Background Information

The electric power industry has developed sophisticated relays that perform multiple protection, monitoring and management functions for electric power systems. Such relays are very complex and now employ microprocessors to implement the numerous functions. The protection functions performed can generate trip signals which lead to interruption of current in the event that protection criteria are exceeded. Protection is typically provided for phase, ground, and negative sequence, instantaneous and time overcurrents. Under voltage, overvoltage and under frequency protection can also be provided. The monitoring functions can include waveform capture and logging of many parameters. As a result, there are numerous settings that must be loaded into the relay. These settings interact to effect the overall performance of the relay. Thus, merely confirming that the intended settings have been entered does not assure that the desired performance will be obtained.

It is known, therefore, to test the relays by inserting test values of power system currents and voltages utilized by the relay, selected to simulate a desired condition. To date, such testing has required termination of the protective functions.

There is an interest in being able to maintain the protection functions of a power system relay while performing tests.

SUMMARY OF THE INVENTION

The present invention is directed to a method of testing power system relays on-line without losing the protection functions. The on-line method of testing a power system relay that utilizes sensed values of power system current and voltage to perform specified functions comprises: substituting test values for the sensed values of power system parameters to perform the specified functions while simultaneously monitoring the sensed values of at least the power system currents. The method further includes terminating use of the test values and returning to use of the sensed values of power system parameters to perform the specified relay functions when the sensed value of at least one of the power system currents exceeds a selected threshold. This threshold can be about 10 percent of rated current. Termination of use of the test values and return to the use of the sensed values of power system current and voltage also occurs when a selected time interval after initiation of the use of the test values has expired. This selected time interval can be an interval which exceeds the time required for the relay to respond to the longest event simulated by the test values. As another aspect of the invention, the sensed values of the power system currents and voltages that result in a certain event under a specified relay function are stored and subsequently used as the test values. Such an event can include the generation of a trip signal.

The invention also encompasses an electric power system relay incorporating a simulator for testing the relay without loss of the protection functions. More particularly it relates to such a relay which includes relay logic performing specified relay functions, sensors generating sensed values of current and voltage for use by the relay logic in performing the specified relay functions, and a simulator having an input device for inputting test values of current and voltage, a data switch having a first position in which the sensed values of current and voltage are provided to the relay logic for performing the specified relay functions, and a second position in which the test values are provided to the relay logic for performing the specified relay functions in place of the sensed values of current and voltage, and switch logic monitoring the sensed values of current and voltage and operating the data switch from the second position to the first position to remove the test values of current and voltage from the relay logic and to reapply the sensed values of current and voltage to the relay logic. The switch logic further includes a timer that also operates the data switch from the second position to the first position to remove the test values of current and voltage from the relay logic and to reapply the sensed values of current and voltage to the relay logic when a selected timing interval expires. Preferably, the selected timing interval is longer than the time required for the relay logic to perform the specified relay functions. The relay logic can also include a memory in which the sensed values of current and voltage are stored for later use by the simulator as test values.

BRIEF DESCRIPTION OF THE DRAWING

A full understanding of the invention can be gained from the following description of the preferred embodiments when read in conjunction with the accompanying drawings in which:

The FIGURE is a functional diagram of a relay that operates in accordance with the invention.

DESCRIPTION OF THE PREFERRED EMBODIMENTS

The relay 1 shown in the FIGURE is an integrated system for protection, control, metering and monitoring of an electric power system and particularly of a feeder system. The relay 1 includes sensors 3 in the form of current transformers (CTs) and voltage transformers (VTs). Four voltages and four currents are sensed, three phase currents and voltages and ground current and voltage. The analog signals generated by the sensors are digitized in an analog to digital (A/D) converter 5 for input to a microprocessor 7. The microprocessor 7 includes software 9 which calculates from the digitized sensor inputs RMS and phasor currents and voltages which are used by relay logic 10 in the form of algorithms and programmable logic that perform the specified relay functions which include protection, control, metering and monitoring. The protection functions include instantaneous and time overcurrent protection, which under specified conditions can result in a generation of a trip signal that is used in a conventional manner to interrupt current in the monitored feeder. The relay has a memory 11 in which events and the sensed currents and voltages which produce those events can be logged. In certain events, the waveforms are captured and also stored in the memory 11.

The relay 1 performs numerous functions in providing protection, control, metering and monitoring. In addition, the relay 1 has several hundreds of settings, which offer the user a great deal of flexibility to configure the relay. This includes the ability of the user to specify some very complex logic in addition to the algorithms incorporated into the relay.

In order to address these issues and others, the relay 1 includes a built-in on-line fault simulator 13 which is implemented in software through an input device in the form of a user interface panel 17. The user can specify a fault condition through the user interface panel 17 by entering the magnitude and phase for each of the currents and voltages. The module 19 converts these settings into simulated voltage and current phasors. A data switch 21 selects between the sensed currents and voltages provided by the module 9 and the simulated current and voltage phasors provided by the module 19 for use by the algorithms and programmable logic modules of the relay logic 10 in performing the specified relay functions. Normally, the data switch 21 will be in the "0" position in which the sensed currents and voltages are used to perform the specified relay functions. The data switch 21 is controlled by switch logic 23 in the form of an AND gate 25 which includes as one input a signal from the user interface panel 17 to substitute the test currents and voltages for the sensed currents and voltages. The AND gate 25 also includes two inverted inputs, one from a current detector 27 and another from a timer 29. The current detector 27 monitors the sensed currents. Its output is low, as long as the sensed currents remain below a specified value. The timer 29 initiates timing when substitution of the test currents and voltages is initiated from the user interface panel. Its output remains low until the specified timing period times out. Thus, with the sensed currents below the specified values, the data switch 21 switches to the "1" position to substitute the test values of current and voltage for the sensed values to be used in performing the relay functions when the test signal is received from the user interface panel 17. The value of the test currents and voltages may be obtained from any simple or complex fault analysis program, or from fault records, or even from the user's imagination, as long as they are in the ranges of the relay specifications. Thus, the fault simulator can provide a convenient way to verify the various relay settings before the relay is put into service. It can also be used to see how the programmed functions respond to inputs. It can further be used to play back the data that was recorded in the memory 11 for actual or simulated events.

If at any time during testing, the current detector 27 determines that any of the currents have exceeded specified threshold values, the current detector output goes high to cause the data switch 21 to return to the "0" position to terminate use of the test currents and voltages and return to the use of the sensed currents and voltages for use by the relay logic 10 in performing the relay functions. Also, when the timer 29 times out, its output goes high to also switch back from the test values to the sensed values of current and voltage as the inputs to the relay logic 10. The timing interval is selected to be longer than the time required for the simulated event. Depending upon the fault conditions represented by the test currents and voltages and the relay settings, some relay functions may pick up and trip. If the relay trips on the simulated fault, the simulation will immediately cease. The test results will be saved in the memory 11 and can be used later for further analysis. If no trip is produced, the simulation will cease at the end of the specified timer interval. The test can also be terminated at any time from the user interface panel 17.

In accordance with the invention, the actual voltages, currents and other discrete inputs to the relay 1 are constantly being acquired and processed, regardless of whether the simulation is on or off. Therefore, there is no loss of actual data during the test. If there is a fault during simulation, the relay will respond according to the relay settings regardless of the simulation. Operation of the relay outputs can be enabled or disabled during the test. If disabled, any trips that occur during the test will be recorded, but the trip relay will not operate.

It can be seen, therefore, that the invention can be used to verify that the relay responds as intended to selected conditions. It can also be used to verify the settings of the relay before it is put into service, provide data required for detailed analysis, replay prior recorded actual events and test the protection functions without interrupting protection.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. An on-line method of testing an electric power system relay that uses digitized real time sensed values of power system currents and voltages to perform specified relay functions, the method comprising the steps of:

substituting test values for sensed values of power system currents and voltages to perform the specified relay functions while simultaneously monitoring the sensed value of at least the power system currents; and terminating use of the test values and returning to the use of the sensed values of the power system currents and voltages to perform the specified relay functions when the sensed value of any one of the power system currents monitored exceeds a selected threshold.

2. The method of claim 1 wherein the threshold at which use of the test values of power system currents and voltages as terminated is about 10 percent of rated current.

3. The method of claim 1 wherein the test values of power system currents and voltages are phasor values.

4. The method of claim 1 wherein terminating use of the test values of power system currents and voltages and return to use of the sensed values of power system currents and voltages to perform the specified relay functions also occurs when the selected time interval commencing when the test values are substituted for the sensed values of power system currents and voltages has expired.

5. The method of claim 4 wherein the selected time interval exceeds time for the relay to respond to a longest event simulated by the test values of the power system currents and voltages.

6. The method of claim 1 wherein the step of substituting test values for sensed values of power system currents and voltages includes storing sensed values of power system currents and voltages that result in certain events during performance of the specified relay functions using the sensed values of power system currents and voltages, and subsequently using those sensed values of power system currents and voltages which have been stored as the test values of power system currents and voltages.

7. The method of claim 6 wherein the sensed values of power system currents and voltages which are stored are phasor values.

8. The method of claim 6 wherein the certain events include generation of a trip signal.

* * * * *